Aug. 25, 1953     C. S. TAYLOR     2,649,964
LIQUID DISPERSION SEPARATING DEVICE
Filed June 27, 1949     2 Sheets-Sheet 2
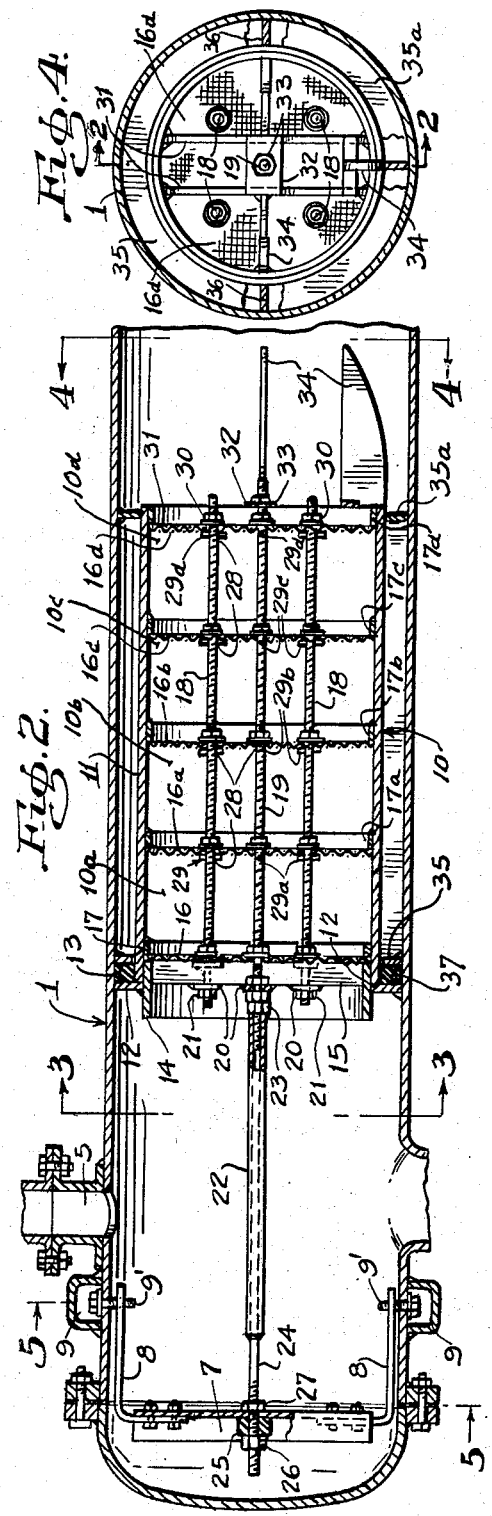
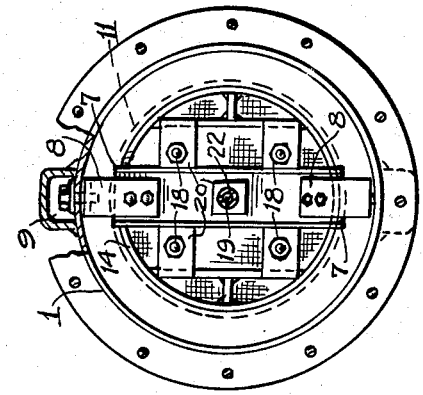
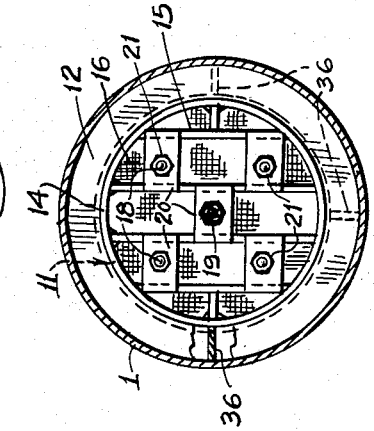
INVENTOR.
Charles S. Taylor
BY
ATTORNEY.

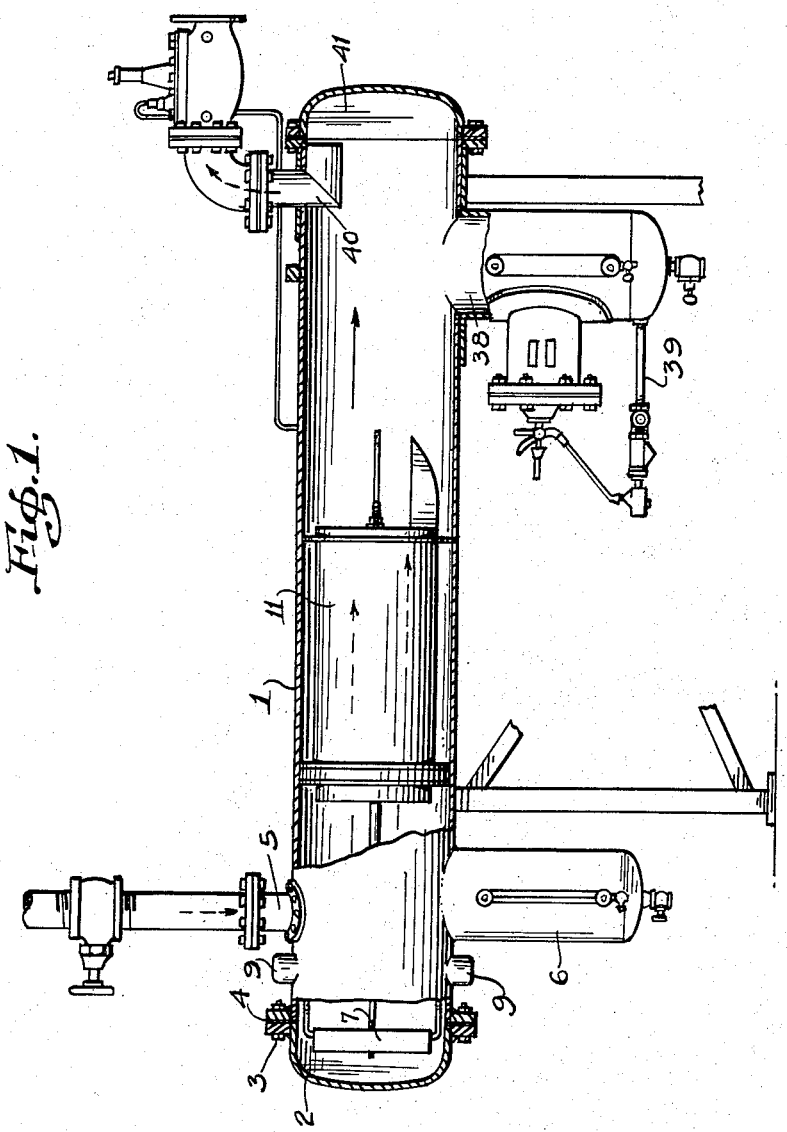

Patented Aug. 25, 1953

2,649,964

UNITED STATES PATENT OFFICE 2,649,964

LIQUID DISPERSION SEPARATING DEVICE

Charles S. Taylor, Los Angeles, Calif.

Application June 27, 1949, Serial No. 101,620

12 Claims. (Cl. 210—135)

This invention relates to improvements in fluid decontaminator devices.

The separation of dispersed or suspended solids and liquid particles from other liquids in which they are dispersed or suspended by the use of a bed of filtering media, such as granular solids, or packed fibrous media, such as excelsior, is an old art.

One of the most successful devices for such purpose is a body of excelsior of properly selected grade, packed in a cartridge to a selected bulk density designed to give a non-channelling bed effective to separate the suspended solids and coalesce the suspended or otherwise dispersed liquid particles. Such units have been highly effective for such purpose and have given useful service.

Experience has shown, however, that when these units are employed to coalesce dispersed liquid particles and remove suspended solids there is a progressive rise in the pressure drop across such units and that this increase in pressure drop may be accompanied by diminution in efficiency of the pack in the separation of the water.

I have found by a study of such units that when a stream of liquid to be treated is passed under flow line pressure through an excelsior body, the excelsior rams or packs in the cartridge. The excelsior tends to creep toward the discharge end. There is a progressive change in the original packing, i. e., the bulk density of the original pack, in such manner that at the inlet end the pack is looser, i. e., of lesser bulk density, than the original pack and this bulk density becomes progressively greater toward the discharge end, being, at the discharge end, of higher bulk density than the original pack, i. e., the original bulk density. I have found that when this situation has arisen there is a serious impairment in the efficiency of the unit.

My investigation of this difficulty with prior art operations has revealed that the disturbance of the original distribution of the excelsior, i. e., the original bulk density, also results in channelling in the body of the excelsior with the result that fluids by-pass the mass of the contact surfaces and follow the path of least resistance formed by the channels. This is one cause of the reduced efficiencies of such "rammed" units. I have also found that, provided that the excelsior is uniformly distributed through the body of the pack, there is a most efficient bulk density for each service, depending not only on the nature of the fluids and their contaminants, but also on their concentration and also upon the velocity of the flow of the fluid through the pack. I have found that when an excelsior pack of such originally desired uniform bulk density is employed the initial separating efficiency is excellent. I thus ascribe the diminution of separating efficiency that results from ramming both to the channelling that occurs and also to the creation of a non-uniform pack, the bulk density of which varies from inlet to outlet and is different from the original desirable bulk density. I have also found that as ramming is effected there is a progressive rise in pressure drop across the unit which may become so large as to effectively prevent flow through the unit.

I have thus discovered why prior art excelsior water and solid separators have failed in such service.

This phenomenon which I have found to be one of the principal reasons for failure in prior art excelsior packs is also present if other springy, i. e., resilient, packs are employed in the place of excelsior. It is also thus present when straw, glass wire, mineral wool, metallic wool, glass fiber, or other natural or synthetic fibers are employed, and, in fact, any body of particles or fibers which forms a compressible mass, particularly if the bed is of such nature that the fibers or particles may move with respect to each other, i. e., is subject to creep or ramming. I shall refer to all such beds as resilient particulate beds.

As a result of my investigations into this phenomenon of ramming in resilient particulate beds, I have found that this ramming is a cumulative or progressive phenomenon, that is, the excelsior pack creeps in the direction of fluid flow, so as to reduce the original bulk density, i. e., attenuate the pack at the entrance and cause a progressive packing in the direction of flow toward the fluid end from the pack. I have found as a result of study and experimentation that the degree of creep, i. e., the amount of ramming, depends upon the length of the pack measured in the direction of fluid flow. I have found that by reducing this length, I may minimize and substantially inhibit any substantial creep or ramming and thus maintain the original bulk density at the desired value throughout service life much longer than could otherwise be obtained. This non-ramming length will depend upon the character of the excelsior as well as upon the fluid velocities and pressure employed and also on the nature of the fluids and the nature and concentration of the contaminants.

I have also found that for many, and as far as I have been able to determine from experience, for a large variety of liquids, the non-ramming length suitable for maintaining the original bulk density is not sufficient to obtain the required coalescence of the dispersed liquids. I, therefore, juxtapose two or more units, each separately of non-ramming length, in series to obtain the desired length of passage of fluid. I have found it desirable to make these units contiguous so that there is a substantially continuous body composed of sections, each of non-ramming length, each section being contained between partitions which separate the units. The fluid discharge of each unit passes directly into the next adjacent unit. I have found it desirable to so form the units so that there is a minimum chance for re-mixing of the separated fluid or fluid and solid phases in the passageway between the units and preferably to insure the presence of a substantially continuous particulate bed which is compressible only between the rigid partitions, and in which the creep or ramming is not transmitted in any substantial degree through the partitions, i. e., from one unit to the other.

In this manner the liquid is contacted substantially continuously in its flow through the units and no space is provided in which any re-mixing of the phases occurs to any substantial degree.

The separation of the resilient particulate body into sections also permits me to adjust the individual bulk density of each body so that I may, if desirable, as I have found it to be in some cases, make the different units of different bulk densities or of different particulate composition, using different resilient media in the units in any desired relationship.

Because in the decontaminators of my invention the creep is eliminated and the original configuration of the particles or fibers is preserved I may pack each unit with different layers of material and incorporate in each unit any desired layer of either resilient or rigid particles or different layers of fibrous material.

Summarizing my invention, I have devised for this purpose a container for a body of contact material, which container is composed of juxtaposed chambers, contiguous chambers being separated by diaphragms having fluid passageways and adapted to receive resilient bodies of particulate material, said bodies forming a substantially continuous mass of desired composition and distribution of particulate bodies with means for passing a flow of fluid through said units and diaphragms.

I have also devised a novel procedure or method for forming such units to have the desired distribution of packed material which results in a pack of high efficiency in the separation of liquid or solids or semi-solids from a continuous liquid phase.

These and other objects of my invention will appear from a description of one embodiment of my invention, taken together with the drawings, in which Fig. 1 is a view partly in section of the contactor of my invention in position in a suitable separating unit employed in the separation of dispersed liquids;

Fig. 2 is an enlarged detail of Fig. 1, taken on line 2—2 of Fig. 4;

Fig. 3 is a section taken on line 3—3 of Fig. 2;
Fig. 4 is a section taken on line 4—4 of Fig. 2;
Fig. 5 is a section taken on line 5—5 of Fig. 2.

The separator shell 1 has a removable bumped head, suitably held by bolts 3 and gasket 4 on the end of the shell 1. A suitable fluid inlet 5 and a sump 6 is provided. Mounted in the front end of the shell 1 is a channel bracket 7 mounted upon angles 8 which are connected to the shell 1 by pins 9'. The pins are covered by covers 9 which are welded to the exterior of the case to prevent leak of fluid around the pins. The contactor body 10 herein also referred to as a cartridge, is contained in a shell 11 carrying an external ring flange 12 at the front end thereof and a circumferential flange ring 13 mounted at the exterior rim of the flange 12. A grid 15 is welded to 14.

A perforate diaphragm 16 in the form of a screen, as illustrated in Fig. 2, whose mounting will be more fully described below abuts the ring 14 and a ring 17 abuts the diaphragm 16 and ring 14 and ring 17 are welded or otherwise secured to the shell 11. Passing through the diaphragm through bores suitably provided is a series of threaded tie rods 18 and an axial tie rod 19 all of which at their forward ends pass through clamping plates 20 which are mounted against the exterior of the grid 15. The tie rods are held in clamping position, as will be described later, against the plates 20 by nuts 21.

Mounted on the forward threaded end of the rod 19 is a sleeve 22 carrying a nut 23 welded to the forward end thereof and connected at the other end to an axial external rod extension 24 which passes through the channel 7 and the block 25. Nuts 26 and 27 are mounted on the rod 24, one on each side of the block 25 and channel 7. Suitably positioned at predetermined points of the tie rods 18 and 19 are bores 28 through which are passed cotter pins 29, 29a, 29b, 29c, and 29d. The diaphragms 16, 16a, 16b, 16c, and 16d, all of which are of similar construction, are slidably positioned on the rods 18 and 19, abut these pins and are clamped against the pins by nuts 30. The exterior rim of each diaphragm 16, 16a, 16b, 16c, and 16d abuts rings 17 and the wall of 11, and respectively, 17a, 17b, 17c, and 17d, all of which are similarly constructed and welded to the shell 11 and form a seal at the wall. The structure thus prevents by-passing of fluid around the edges of the diaphragms 16, 16a, 16b, 16c, and 16d.

Mounted on the other end of the shell 11 is a grid 31 welded to the end ring 17D. The grid 31 carries a clamping plate 32 through which the rod 19 passes and the rod 19 carries a clamping nut 33.

Mounted on the grid 31 at spaced points circumferentially disposed about the shell 11 is a plurality of positioning shoes 34.

The shell 11 is positioned in the shell 1 on centralizing and positioning rings 35 welded to the interior of the shell 1 and spaced to receive the shell 11. Connecting the rings 35 and 35a at circumferentially spaced points is a plurality (shown as three in number) of skid bars 36.

A suitable ring gasket 37 is placed in the box formed by the rings 12, 13 and 35.

The discharge end of the shell 1 carries a sump 38 with a float controlled discharge line 39 and a liquid discharge line 40 and is closed by a suitably mounted bumped head 41.

The unit 10 is assembled as follows. The shell 11, carrying the flange 12, rings 13, and grid 15, is packed with the resilient particulate material in the following manner. The rods 18 and 19 are passed through the clamping plates 20 and nuts 21 are placed loosely thereon. The pins 29 are pressed through the rods at the first position adjacent the clamping plates. The diaphragm 16 is then centered over the rods and the nuts 30 are screwed down to hold the diaphragm against the pins. The first ring 17 is then placed and welded in position. The particulate material is then placed uniformly in the shell 11 against the diaphragm 16. The amount of material thus introduced should be such that when compressed between the diaphragms 16 and 16a, the desired bulk density is obtained.

For purposes of illustration, but not as a limitation, I shall illustrate this procedure by reference to a construction which I have found highly useful for separation of water and solid particles from hydrocarbon oils.

After the diaphragm 16 has been put in place, I insert excelsior which is substantially non-swelling when wetted with water and is free of resins, such as an excelsior made of northern poplar, aspen, or baywood. Such excelsiors are available in commerce but usually are contaminated with chips, matted fibers, fine dust and broken particles. Such materials may make up as much as one-third of the weight of the baled excelsior. I have found it desirable to remove these contaminants in order to obtain an excelsior which is substantially made up of interlaced, long and thin strands of wood. This excelsior is placed over the diaphragm 16 in small amounts to distribute the same uniformly across the diaphragm 16. A desired weight of such excelsior is placed over the diaphragm 16. Pins 29a are then placed in position and more excelsior is added until the desired weight of excelsior is placed over the diaphragm 16. The diaphragm 16a is then entered over the rods and pushed against the pins 29a. Thus by placing the proper weight of material over diaphragm 16, and since the volume of the space between 16 and 16a is known, the excelsior can be compressed uniformly to a predetermined bulk density. Nuts 30 are then screwed into position to clamp the diaphragm 16a in position and the ring 17A is abutted against the diaphragm and welded to the shell 11.

In like manner, each of the diaphragms 16b, 16c, and 16d are placed in position with excelsior of predetermined bulk density selected for the several units 10, 10A, 10B, and 10C.

On occasion I desire to employ two or more different media in each or in selected partitions. For example, I may, after entering and positioning diaphragm 16, first place a layer of excelsior against diaphragm 16 and then place a layer of glass fiber or glass wool over the excelsior and then enter the diaphragm 16a and compress the fibers and clamp 16a in position in the manner described above. I may thus also construct the units 10A and 10B, but preferably I employ only excelsior in unit 10C. The degree of compaction, i. e., the bulk density in the unit 10C, is usually and is preferably of much lower bulk density than in the other compartments.

The unit is now ready for entry into the separator body with the angle 8 and the channel 7 removed, and with the sleeve 22 mounted on the rod 19 with the nut 23 abutting nut 21, the unit is introduced into the body 1. As the unit carrying the gasket 37 is pushed forward, the skids guide the unit over the ring 35 and along the skids 36 and over the ring 35A. The nut 27 is threaded on rod 24. The angle 8 and channel 7 is placed in position. The nut 27 is rotated against the channel 7, the rod 24, and the sleeve 22 is advanced longitudinally over the end of the rod 19. The nut 23 exerts a pressure against the nut 21, thus forcing the unit down the shell 1, compressing the packing 37. The nut 26 is then locked in place. The head 2 may then be mounted.

While I have described a particular embodiment of my invention for the purpose of illustration, it should be understood that various modifications and adaptations thereof may be made within the spirit of the invention as set forth in the appended claims.

I claim:

1. A phase separator for liquid containing a plurality of phases which comprises a chamber, an inlet to said chamber, an outlet from said chamber, a plurality of contiguous compartments positioned in said chamber between the said inlet and outlet, perforate partitions between said compartments, means for holding said partitions in a predetermined position in said chamber and against displacement in the direction of said outlet, liquid passageways in said partitions, a resilient particulate bed filling each of said compartments between said partitions, said beds in said compartments being adjacent each other forming a substantially continuous resilient particulate bed in said separator.

2. A cartridge for a phase separator for liquid containing a plurality of phases which comprises an inlet and outlet in said cartridge, grids mounted in the cartridge at each end thereof, a plurality of tie rods extending through said cartridge and mounted on said grids, a plurality of spaced perforate diaphragms slidably positioned in said cartridge, means for positioning and holding said diaphragms in predetermined spaced relationship on said tie rods, and resilient particulate beds positioned between said partitions forming a substantially continuous bed between said partitions.

3. A separator comprising a cylindrical body having an opening at one end of said body, a closure for said opening, a liquid inlet and outlet from said body, a removable cartridge in said body, insertable and removable through said opening and positioned between said inlet and outlet, said cartridge comprising a chamber, an inlet at one end of said chamber, an outlet from said chamber, a plurality of contiguous compartments positioned in said chamber between the said inlet and outlet, spaced partitions in said chambers, a liquid tight seal between the walls of the chamber and the edge of said partitions, liquid passageways in said partitions, a resilient particulate bed filling each of said chambers between said partitions, and a gasket seal between said cartridge and the wall of said body.

4. A separator comprising a cylindrical body having an opening at one end of said body, a closure for said opening, a liquid inlet and outlet from said body, a removable cartridge in said body, insertable and removable through said opening and positioned between said inlet and outlet, said cartridge comprising a chamber, an inlet at one end of said chamber, an outlet from said chamber, a plurality of contiguous compartments positioned in said chamber between the said inlet and outlet of said chamber, partitions between said compartments, a liquid tight seal between the walls of the chamber and the edge of said partitions, liquid passageways in said partitions, a resilient particulate bed filling each of said chambers between said partitions, said beds in said chambers being adjacent each other and forming a substantially continuous resilient particulate bed in said separator, and a gasket seal between said cartridge and the wall of said body.

5. A separator comprising a cylindrical body having an opening at one end of said body, a closure for said body, a liquid inlet and outlet from said body, a removable cartridge in said body, insertable and removable through said opening and positioned between said inlet and outlet, said cartridge comprising an inlet and outlet to said cartridge, grids mounted in the cartridge at each end thereof, a plurality of tie rods extending through said cartridge and mounted in said grids, a plurality of spaced perforate diaphragms slidably positioned in said cartridge and abutting the wall of said cartridge, means for positioning and holding said diaphragms in predetermined spaced relationship on said tie rods, a liquid tight seal between the walls of the chamber and the edge of said partitions, and a gasket seal between said cartridge and the wall of said body.

6. A separator comprising a cylindrical body having an opening at one end of said body, a closure for said opening, a liquid inlet and outlet from said body, a removable cartridge in said body, insertable and removable through said opening and positioned between said inlet and outlet, said cartridge comprising an inlet and outlet, grids mounted in the cartridge at each end thereof, a plurality of tie rods extending through said chamber and mounted in said grids, a plurality of spaced perforate diaphragms slidably positioned in said chamber and abutting the wall of said cartridge, a liquid tight seal between the walls of the chamber and the edge of said partitions, means for positioning and holding said diaphragms in predetermined spaced relationship on said tie rods, resilient particulate beds positioned between said partitions forming a substantially continuous bed in said separator, and a gasket seal between said cartridge and the wall of said body.

7. A phase separator for liquid containing a plurality of phases, which comprises an outer chamber, said outer chamber having a circumambient wall, a closure at one end of said chamber, said outer chamber having an opening at the other end, a removable closure for said opening, a liquid inlet and outlet, one at each end of said outer chamber, a slidable cartridge in said chamber, means for holding said cartridge in position in said outer chamber, said cartridge comprising a cartridge chamber, a circumambient wall for said cartridge chamber, a liquid seal between the circumambient wall of said cartridge chamber and said circumambient wall of said outer chamber, an inlet to said cartridge chamber, said inlet to said cartridge chamber being in liquid communication with the inlet to said outer chamber, an outlet from said cartridge chamber, said outlet from said cartridge chamber being in liquid communication with said outlet from said outer chamber, a plurality of contiguous compartments positioned in said cartridge chamber between the said inlet and outlet, perforated diaphragms between said compartments, means for holding said diaphragms in a predetermined position in said cartridge chamber and against displacement in the direction of said outlet, liquid passageways in said partitions, and a resilient particulate bed filling each of said compartments between said diaphragms.

8. A phase separator for liquid containing a plurality of phases, which comprises an outer chamber, said outer chamber having a circumambient wall, a closure at one end of said chamber, said outer chamber having an opening at the other end, a removable closure for said opening, a liquid inlet and outlet, one at each end of said outer chamber, a slidable cartridge in said chamber, means for holding said cartridge in position in said outer chamber, said cartridge comprising a cartridge chamber, a circumambient wall for said cartridge chamber, a liquid seal between the circumambient wall of said cartridge chamber and said circumambient wall of said outer chamber, an inlet to said cartridge chamber, said inlet to said cartridge chamber being in liquid communication with the inlet to said outer chamber, an outlet from said cartridge chamber, said outlet from said cartridge chamber being in liquid communication with said outlet from said outer chamber, a plurality of contiguous compartments positioned in said cartridge chamber between the said inlet and outlet, perforate diaphragms between said compartments, means for holding said diaphragms in a predetermined position in said cartridge chamber and against displacement in the direction of said outlet, a resilient particulate bed filling each of said compartments between said diaphragms, said beds in said cartridge chambers being adjacent each other and forming a substantially continuous resilient particulate bed in said cartridge.

9. A phase separator for liquid containing a plurality of phases, which comprises an outer chamber, said outer chamber having a circumambient wall, a closure at one end of said chamber, said outer chamber having an opening at the other end, a removable closure for said opening, a liquid inlet and outlet, one at each end of said outer chamber, a slidable cartridge in said chamber, means for holding said cartridge in position in said outer chamber, said cartridge comprising a cartridge chamber, a circumambient wall for said cartridge chamber, a liquid seal between the circumambient wall of said cartridge chamber and said circumambient wall of said outer chamber, an inlet to said cartridge chamber, said inlet to said cartridge chamber being in liquid communication with the inlet to said outer chamber, an outlet from said cartridge chamber, said outlet from said cartridge chamber being in liquid communication with said outlet from said outer chamber, a plurality of contiguous compartments positioned in said cartridge chamber between the said inlet and outlet, perforated diaphragms between said compartments, means for holding said diaphragms in a predetermined position in said cartridge chamber and against displacement in the direction of said outlet, and a resilient bed of excelsior filling each of said compartments between said partitions.

10. A cartridge for a phase separator for liquids containing a plurality of phases, which comprises an inlet and outlet to said cartridge, grids mounted in the cartridge at each end thereof, a plurality of tie rods extending through said cartridge and mounted in said grids, a plurality of spaced perforate diaphragms slidably positioned in said cartridge and abutting the wall of said cartridge, means for positioning and holding said diaphragms in predetermined spaced relationship on said tie rods, and a liquid tight seal between the wall of the cartridge and the edge of said diaphragms.

11. A cartridge for a phase separator for liquids containing a plurality of phases, which comprises an inlet and outlet, grids mounted in the cartridge at each end thereof, a plurality of tie rods extending through said cartridge and mounted in said grids, a plurality of spaced perforate diaphragms slidably positioned in said cartridge and abutting the wall of said cartridge, a liquid tight seal between the wall of the cartridge and the edge of said diaphragms, means for positioning and holding said diaphragms in predetermined spaced relationship on said tie rods, and resilient particulate beds positioned between said diaphragms forming a substantially continuous bed.

12. A cartridge for a phase separator for liquids containing a plurality of phases, which comprises an inlet and an outlet to said cartridge, a plurality of contiguous compartments positioned in said cartridge between said inlet and said outlet, partitions between said compartments, the partitions having closely spaced perforations over substantially their entire areas providing for the free flow of liquid therethrough over substantially the entire cross sectional area of the cartridge, means for holding said partitions in predetermined positions in said cartridge and against displacement in the direction of said outlet, and a resilient particulate bed of non-ramming length filling each compartment, said beds forming a substantially continuous resilient particulate bed in the cartridge preventing remixing of the phases, whereby the bed in each compartment maintains contact with the entire areas of the partitions at its ends throughout the useful life of the cartridge.

CHARLES S. TAYLOR.

References Cited in the file of this patent

UNITED STATES PATENTS

| Number | Name | Date |
|---|---|---|
| 368,629 | Trebau | Aug. 23, 1887 |
| 545,122 | Davis | Aug. 27, 1895 |
| 788,359 | Kasper | Apr. 25, 1905 |
| 869,188 | Luckens | Oct. 22, 1907 |
| 1,083,485 | Farmer | Jan. 6, 1914 |
| 1,182,465 | Evans | May 9, 1916 |
| 1,430,234 | Keithline | Sept. 26, 1922 |
| 1,800,093 | Menge | Apr. 7, 1931 |
| 1,934,251 | Austin | Nov. 7, 1933 |
| 2,057,498 | McNeal | Oct. 13, 1936 |
| 2,122,310 | Burt | June 28, 1938 |
| 2,137,556 | Young | Nov. 22, 1938 |
| 2,363,009 | Lewis | Nov. 21, 1944 |
| 2,412,841 | Spangler | Dec. 17, 1946 |
| 2,468,382 | Taylor | Apr. 26, 1949 |

FOREIGN PATENTS

| Number | Country | Date |
|---|---|---|
| 8,637 | Great Britain | A. D. 1889 |
| 9,261 | Great Britain | A. D. 1900 |